US009009526B2

(12) United States Patent
Pan

(10) Patent No.: US 9,009,526 B2
(45) Date of Patent: Apr. 14, 2015

(54) REBUILDING DRIVE DATA

(71) Applicant: Hewlett-Packard Development Company, L.P., Fort Collins, CO (US)

(72) Inventor: Weimin Pan, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/748,923

(22) Filed: Jan. 24, 2013

(65) Prior Publication Data

US 2014/0208155 A1   Jul. 24, 2014

(51) Int. Cl.
*G06F 11/00* (2006.01)
*G06F 11/20* (2006.01)
*G06F 11/10* (2006.01)

(52) U.S. Cl.
CPC .......... *G06F 11/2087* (2013.01); *G06F 11/004* (2013.01); *G06F 11/1088* (2013.01); *G06F 11/2053* (2013.01); *G06F 11/1092* (2013.01)

(58) Field of Classification Search
None
See application file for complete search history.

(56) References Cited

U.S. PATENT DOCUMENTS

| | | | |
|---|---|---|---|
| 7,574,623 B1 * | 8/2009 | Goel et al. | 714/47.2 |
| 7,587,630 B1 * | 9/2009 | Cassell et al. | 714/47.3 |
| 7,716,519 B2 | 5/2010 | Moore et al. | |
| 2005/0114728 A1 * | 5/2005 | Aizawa et al. | 714/6 |
| 2005/0283654 A1 * | 12/2005 | Wood et al. | 714/7 |
| 2005/0283655 A1 * | 12/2005 | Ashmore | 714/7 |
| 2009/0271657 A1 * | 10/2009 | McCombs et al. | 714/6 |
| 2010/0107036 A1 * | 4/2010 | Resnick | 714/763 |
| 2013/0007511 A1 * | 1/2013 | Gaertner et al. | 714/6.22 |

OTHER PUBLICATIONS

Huang, H. et al., Partial Disk Failures: Using Software to Analyze Physical Damage, Sep. 24-Sep. 27, 2007, http://ieeexplore.ieee.org/xpl/login.jsp?tp=&arnumber=4367973&url=http%3A%2F%2Fieeexplore.ieee.org%2Fxpls%2Fabs_all.jsp%3Farnumber%3D4367973, pp. 185-198.

Siewert, S., Disk Failures in Storage Arrays, Mar. 2008, http://www.assurancestorage.com/resources/AssuranceFDIR.pdf.

Wozniak, J.M. et al., Distributed Object Storage Rebuild Analysis via Simulation with Gobs, Jun. 28 to Jul. 1, 2010, http://www.mcs.anl.gov/uploads/cels/papers/P1749.pdf, pp. 23-28.

* cited by examiner

*Primary Examiner* — Gabriel Chu
(74) *Attorney, Agent, or Firm* — International IP Law Group, PLLC

(57) ABSTRACT

A method that includes identifying an inaccessible portion of a first disk drive. The method also includes regenerating data corresponding to the inaccessible portion of the first disk drive and storing the regenerated data to a second disk drive. The method also includes copying data from an accessible portion of the first disk drive to the second disk drive.

20 Claims, 3 Drawing Sheets

200

300

REBUILDING DRIVE DATA

BACKGROUND

A redundant array of independent disks (RAID) is a storage technology that controls multiple disk drives and provides fault tolerance by storing data with redundancy. A failure to access data stored in a disk drive will cause the RAID controller to fail the disk drive and initiate a rebuild process that regenerates the lost data from the other disk drives in the RAID. During this rebuild process, the RAID is in a degraded state and may not be fault tolerant, depending on the particular RAID configuration used. If another failure occurs, the entire volume of data from the failed disk drive can be lost.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure relates to rebuilding a disk drive after a failure. In some embodiments, the disk drive is a component in a redundant array of independent (RAID) disks. In accordance with embodiments, failure to access data in a portion of a disk drive can be detected, and the unreadable memory blocks can be identified. The rebuilding of the failed drive can be performed in a two-stage process. In a first stage, the failed portion of the disk drive can be rebuilt by regenerating, or recreating, the data in the failed portion and writing the regenerated data to a spare drive. In a second stage, the remaining data that can still be accessed from the failed disk drive can be read from the failed disk drive and copied to the spare drive. The amount of time to rebuild the failed portion is substantially less than the amount of time to rebuild the entire disk drive. As a result, the RAID spends substantially less time in a degraded state, and returns to full fault tolerance more quickly. Fault tolerance, as referred to herein, is a measure of the RAID's ability to recover data following a failure. The likelihood of another failure occurring and causing the entire volume of data to be lost is reduced, and the mean time between failures (MTBF) is improved.

Figure 1:
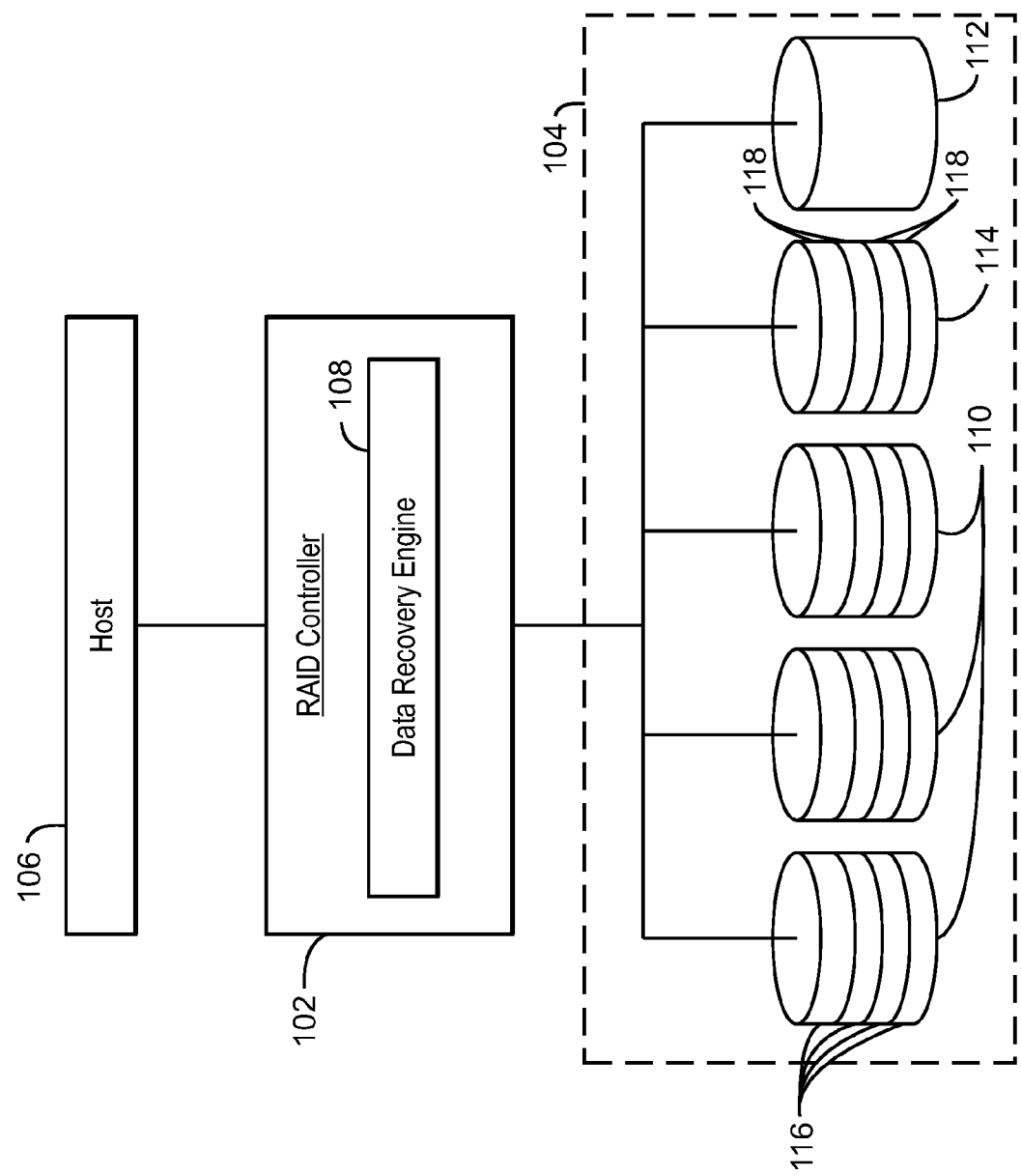
FIG. 1 is a block diagram of a redundant array of independent disks (RAID) system, in accordance with embodiments.

FIG. 1 is a block diagram of a redundant array of independent disks (RAID) system, in accordance with embodiments. The RAID system 100 can include a RAID controller 102 configured to operate an array of drives 104. The RAID system can also include a host computer 106 that can access the array of drives 104 through the RAID controller 102. The RAID controller 102 can include a data recovery engine 108 configured to rebuild data from a disk drive after an access failure renders the data inaccessible. The data recovery engine 108 includes a combination of hardware and programming. For example, the data recovery engine 108 can include a non-transitory, computer-readable medium for storing instructions, one or more processors for executing the instructions, or a combination thereof.

In the event of a failure, the RAID controller 102 can identify the memory location of inaccessible data. A memory location can be a logical block address (LBA), which represents the logical location of data stored in memory. In some embodiments, a table of logical block addresses (LBAs) can be built to expedite the identification of memory locations corresponding to inaccessible data. The table of LBAs can be built by the associated disk drive 110 or by the RAID controller 102.

The array of drives 104 can be a RAID level 0, 1, 2, 3, 4, 5, or 6. The array of drives 104 may include one or disk drives 110 and a spare drive 112. In some embodiments, the array of drives 104 also includes a parity drive 114.

Each of the disk drives 110 is configured to store data. Each disk drive may be composed of more than one portion 116. In some embodiments, if one portion 116 of a disk drive 110 fails, the remaining portions 116 of the disk drive 110 remain functional. Data corresponding to the failed portion 116 can be regenerated and written onto the spare drive 112. The size of the spare drive 112 may be large enough to store data from a portion 116. In one example, the size of the spare drive 112 can be substantially larger. In some embodiments, the size of the spare drive 112 can be as large enough to store data from an entire disk drive 110, or multiple disk drives 110.

The parity drive 114 can contain data or logic that can be used to regenerate data should a disk drive 110 or a portion 116 of a disk drive 110 fail. The data in the parity drive 114 can recreate lost data based on existing data remaining on disk drives 110 and disk drive portions 116 that are still functional. For example, a failed portion 116 can correspond to a failed head of a disk drive 110. A failed portion 116 can also correspond to a memory location that has been rendered inaccessible due to a scratch or other physical defect on the disk drive 110.

In some embodiments, the parity drive 114 contains multiple portions 118, in which each portion 118 corresponds to its respective disk drive portion 116. In some embodiments, the array of drives 104 may not include a dedicated parity drive 114, but rather parity portions 118 distributed among the disk drives 116. In some embodiments, the array of drives 104 may have more than one parity drive 114. In some embodiments, the array of drives 104 does not include a parity drive 114.

The data recovery engine 108 can detect a failure to access data in a portion 116 of a disk drive 110. The data recovery engine 108 can mark the portion 116 as failed. The rebuilding of the failed drive can be accomplished in a two-stage process. During the first stage, the data recovery engine 108 regenerates data corresponding to the failed portion 116 of the disk drive. The data recovery engine 108 can write the regenerated data to the spare drive 112. During the second stage, the data recovery engine 108 copies data from functioning portions 116 of the disk drive 110 to the spare drive 112. In some embodiments, the second stage of the rebuilding process can be performed when the RAID controller 102 is otherwise idle. The data recovery engine 108 can also move the failed disk drive 110 offline.

Figure 2:
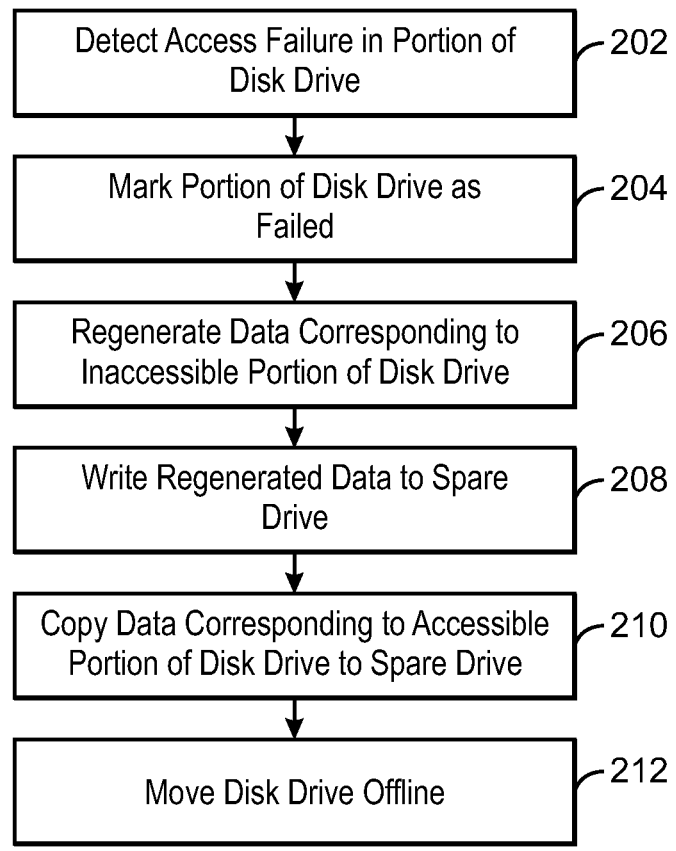
FIG. 2 is a process flow diagram of a method of rebuilding a partially failed disk drive, in accordance with embodiments.

FIG. 2 is a process flow diagram of a method of rebuilding a partially failed disk drive, in accordance with embodiments. In some embodiments, the method 200 can be performed by a redundant array of independent disks (RAID) controller operating upon a RAID.

At block 202, the RAID controller detects an access failure in a portion of a disk drive. The access failure can occur on a READ request or a WRITE request. The disk drive can search through a table of logical block addresses to identify a memory location corresponding to the portion of the disk drive that has been rendered inaccessible by the failure. The memory location of the inaccessible portion can be reported to the RAID controller.

At block 204, the RAID controller marks the portion of the disk drive as failed. The portion is thus identified as an inaccessible portion of the disk drive. The RAID controller can save information regarding the inaccessible portion to the RAID controller's metadata. The information saved can include the portion of the disk drive that has failed, as well as the range, or ranges, of logical block addresses where failed data resides.

At block 206, the RAID controller regenerates data corresponding to the inaccessible portion of the disk drive. In some embodiments, the RAID includes a parity drive encoded with logic or code that can be used to recreate lost data corresponding to the disk drive. The parity drive can regenerate the lost data based on data stored in other functioning disk drives or disk drive portions.

At block 208, the RAID controller writes the regenerated data to a spare drive. Writing the regenerated data to the spare drive restores the RAID to the full fault tolerance, meaning that the RAID is no longer at risk of losing data permanently in the event of further failures. In some embodiments, the spare drive can be large enough to store the data corresponding to the failed portion of the disk drive.

At block 210, the RAID controller copies data corresponding to an accessible portion of the disk drive to the spare drive. In some embodiments, the act of copying other data to the spare drive does not affect the MTBF, as writing the regenerated data to the spare drive already restores the RAID to full fault tolerance. Thus, this stage of the rebuild process can be optional. During this stage, the RAID controller can use a low priority to minimize the impact on performance. If more than one failure has occurred, this stage can be delayed such that data corresponding to another inaccessible portion or another disk drive can be regenerated and written to the spare drive. In some embodiments, this stage is performed when the RAID controller is otherwise idle.

If the access failure occurred on a READ request, then the READ request can be sent to the spare drive to read the regenerated data. If the access failure occurred on a WRITE request, then the WRITE request can be sent to the spare drive while the parity drive is updated accordingly to the newly written data.

At block 212, the RAID controller moves the disk drive offline. If the disk drive has been rebuilt via the spare drive, then it is no longer necessary. Thus, the disk drive can be logically removed from the RAID system.

Figure 3:
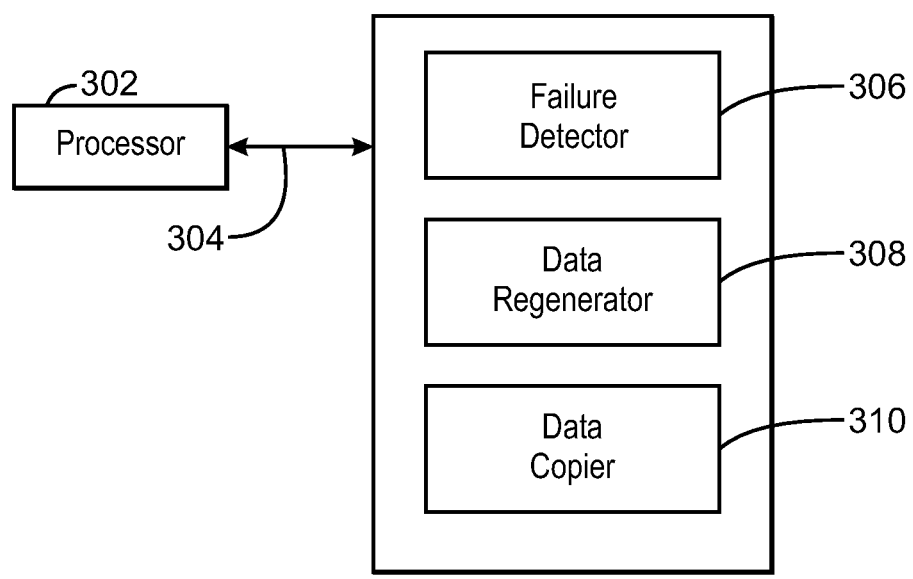
FIG. 3 is a block diagram showing a tangible, non-transitory, computer-readable medium that stores code configured to rebuild a partially failed disk drive, in accordance with embodiments.

FIG. 3 is a block diagram showing a tangible, non-transitory, computer-readable medium that stores code configured to rebuild a partially failed disk drive, in accordance with embodiments. The tangible, non-transitory, computer-readable medium is referred to by the reference number 300. The tangible, non-transitory, computer-readable medium 300 can comprise RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory, computer-readable medium 300 may be accessed by a processor 302 over a computer bus 304. Furthermore, the tangible, non-transitory, computer-readable medium 300 may include code configured to perform the methods described herein.

The various software components discussed herein may be stored on the tangible non-transitory computer-readable medium 300. A first region 306 on the tangible, computer-readable medium 300 can include a failure detector to detect an access failure in a portion of a disk drive and mark the portion of the disk drive as failed. A region 308 can include a data regenerator to regenerate data corresponding to an inaccessible portion of the disk drive and write the regenerated data to a spare drive. A region 310 can include a data copier to copy data corresponding to an accessible portion of the disk drive to the spare drive. Although shown as contiguous blocks, the software components can be stored in any order or configuration. For example, if the tangible, non-transitory, computer-readable medium is a hard drive, the software components can be stored in non-contiguous, or even overlapping, sectors.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system, comprising:
   an array of drives comprising a first disk drive and at least a second disk drive; and
   a controller communicatively coupled to the array of drives, the controller to identify an inaccessible portion of the first disk drive, and perform a disk drive rebuild comprising a first stage and a second stage that follows the first stage;
   wherein during the first stage, the controller is to regenerate data corresponding to the inaccessible portion of the first disk drive, and store the regenerated data to the second disk drive; and
   during the second stage, the controller is to copy data from an accessible portion of the first disk drive to the second disk drive.

2. The system of claim 1, the array comprising a parity drive.

3. The system of claim 1, comprising a host computer communicatively coupled to the controller.

4. The system of claim 1, wherein the array is a redundant array of independent disks.

5. The system of claim 1, the first disk drive to identify a memory location corresponding to the inaccessible portion of the first disk drive.

6. The system of claim 1, the first disk drive to report the memory location to the controller.

7. A method comprising:
   identifying an inaccessible portion of a first disk drive;
   during a first stage of a spare rebuild process, regenerating data corresponding to the inaccessible portion of the first disk drive, and storing the regenerated data to a second disk drive; and
   during a second stage of the spare rebuild process that follows the first stage, copying data from an accessible portion of the first disk drive to the second disk drive.

8. The method of claim 7, comprising copying data to the second disk drive only during times when the controller is otherwise idle.

9. The method of claim 7, comprising identifying a memory location corresponding to the inaccessible portion of the first disk drive.

10. The method of claim 7, comprising moving the first disk drive offline.

11. The method of claim 7, wherein an access failure occurs on a READ request, the method comprising sending the READ request to the second disk drive.

12. The method of claim 7, wherein an access failure occurs on a WRITE request, the method comprising sending the WRITE request to the second disk drive.

13. The method of claim 12, comprising updating a parity drive in response to the WRITE request.

14. A tangible, non-transitory, computer-readable medium comprising code configured to direct a processor to:
   identify an inaccessible portion of a first disk drive;
   during a first stage of a spare rebuild process, regenerate data corresponding to the inaccessible portion of the first disk drive, and store the regenerated data to a second disk drive; and
   during a second stage of the spare rebuild process that follows the first stage, copy data from an accessible portion of the first disk drive to the second disk drive.

15. The tangible, non-transitory, computer-readable medium of claim 14, comprising code configured to direct a processor to copy data to the second disk drive only during times when the controller is otherwise idle.

16. The tangible, non-transitory, computer-readable medium of claim 14, comprising code configured to direct a processor to identify a memory location corresponding to the inaccessible portion of the first disk drive.

17. The tangible, non-transitory, computer-readable medium of claim 14, comprising code configured to direct a processor to move the first disk drive offline.

18. The tangible, non-transitory, computer-readable medium of claim 14, wherein an access failure occurs on a READ request, the computer-readable medium comprising code configured to direct a processor to send the READ request to the second disk drive.

19. The tangible, non-transitory, computer-readable medium of claim 14, wherein an access failure occurs on a WRITE request, the computer-readable medium comprising code configured to direct a processor to send the WRITE request to the second disk drive.

20. The tangible, non-transitory, computer-readable medium of claim 19, comprising code configured to direct a processor to update a parity drive in response to the WRITE request.

* * * * *